US012119730B2

(12) United States Patent
Tanimoto et al.

(10) Patent No.: US 12,119,730 B2
(45) Date of Patent: Oct. 15, 2024

(54) CONSTANT STRESS SOLID DISK ROTOR OF FLYWHEEL FOR FLYWHEEL ENERGY STORAGE SYSTEM AND DESIGN METHOD THEREOF

(71) Applicant: NexFi Technology Inc., Suita (JP)

(72) Inventors: Satoshi Tanimoto, Suita (JP); Takashi Nakamura, Suita (JP)

(73) Assignee: NexFI Technology Inc., Osaka (JP)

( * ) Notice: Subject to any disclaimer, the term of this patent is extended or adjusted under 35 U.S.C. 154(b) by 0 days.

(21) Appl. No.: 18/274,608

(22) PCT Filed: Nov. 18, 2021

(86) PCT No.: PCT/JP2021/042387
§ 371 (c)(1),
(2) Date: Jul. 27, 2023

(87) PCT Pub. No.: WO2022/176292
PCT Pub. Date: Aug. 25, 2022

(65) Prior Publication Data
US 2024/0313612 A1 Sep. 19, 2024

(30) Foreign Application Priority Data
Feb. 22, 2021 (JP) ................. 2021-026068

(51) Int. Cl.
*H02K 7/02* (2006.01)
*F03G 3/08* (2006.01)
(52) U.S. Cl.
CPC ............. *H02K 7/025* (2013.01); *F03G 3/08* (2013.01)
(58) Field of Classification Search
CPC .......... H02K 7/02; H02K 7/025; F16F 15/30; F03G 3/08; Y02E 60/16; F16C 2361/55
See application file for complete search history.

(56) References Cited

U.S. PATENT DOCUMENTS 3,436,572 A 4/1969 Storsand
3,496,799 A 2/1970 Call
(Continued)

FOREIGN PATENT DOCUMENTS

JP 844-023285 B1 10/1969
JP 2017-529484 A 10/2017
JP 2022101049 A * 7/2022

OTHER PUBLICATIONS

Dr. A. Stodola, "Steam and Gas Turbines", The McGraw-Hill Book Company, Inc., New York, N.Y. 1927.

*Primary Examiner* — Adam D Rogers
(74) *Attorney, Agent, or Firm* — Carrier, Shende & Associates P.C.; Joseph P. Carrier; Fulchand P. Shende

(57) ABSTRACT

A constant stress solid disk rotor of a flywheel has an outer shape having a plane-symmetric upper surface and lower surface, an outer circumferential radius b, and a rotation center thickness $h_0$, and includes a thickness decreasing region which decreases monotonously in thickness from a rotation center to a connection radius a and a constant thickness region located on an outer edge of the thickness decreasing region and having a constant thickness $h_a$ from the connection radius a to the outer circumferential radius b. Shape parameters including the outer circumferential radius b, the rotation center thickness $h_0$, the connection radius a, and the outer edge thickness $h_a$ satisfy an equation below. Here, $\nu$ is a Poisson's ratio of a rotor material.

$$\frac{a}{b} = \sqrt{\frac{1}{2}\left(-\frac{2}{1-\nu}\left(1+\nu-\frac{2}{\ln\left(\frac{h_a}{h_0}\right)}\right)+\sqrt{\left(\frac{2}{1-\nu}\left(1+\nu-\frac{2}{\ln\left(\frac{h_a}{h_0}\right)}\right)\right)^2+\frac{4(3+\nu)}{1-\nu}}\right)}$$

9 Claims, 5 Drawing Sheets

(56) References Cited

U.S. PATENT DOCUMENTS

| | | | |
|---|---|---|---|
| 4,408,500 A | 10/1983 | Kulkarni et al. | |
| 6,122,993 A | 9/2000 | Morris et al. | |
| 10,003,237 B2 * | 6/2018 | Sanders | H02K 7/025 |
| 10,138,980 B2 * | 11/2018 | Sanders | F16F 15/3153 |
| 10,167,925 B2 * | 1/2019 | Sanders | F16F 15/30 |
| 10,982,730 B2 * | 4/2021 | Gagne | F16C 39/06 |
| 2016/0065032 A1 | 3/2016 | Sanders et al. | |

* cited by examiner

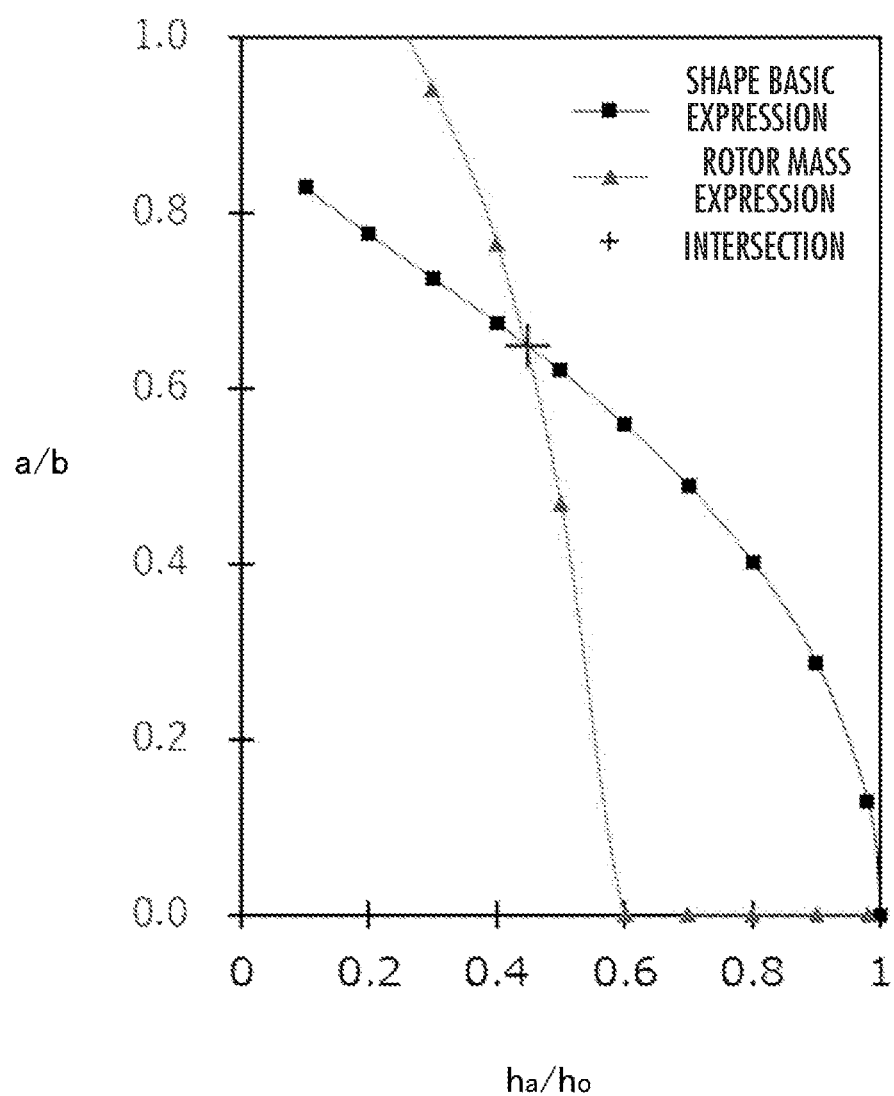

CONSTANT STRESS SOLID DISK ROTOR OF FLYWHEEL FOR FLYWHEEL ENERGY STORAGE SYSTEM AND DESIGN METHOD THEREOF

TECHNICAL FIELD

The present invention relates to a technology for improving a limit energy density per unit mass of a flywheel rotor which is a principal element of a flywheel energy storage device (system) that stores electric power as a kinetic energy of a rotor.

BACKGROUND ART

A flywheel energy storage system is a system having functions of storing external electric power in a flywheel and conversely, feeding electric power of the flywheel to the outside via means for alternately converting electric power and a rotational kinetic energy.

As compared with an electrochemical energy storage system (what is called a secondary battery) which is popular today, the flywheel energy storage system has excellent features such as stable functioning under either a low-temperature environment or a high-temperature environment, infrequent degradation in properties and lifetime even with repeated charging/discharging, easy design change in the input/output power density, and a small internal resistance.

The use of the flywheel energy storage system enables improvement in environment resistance, energy saving, and maintenance performance of electric equipment or a system in which the old secondary battery is utilized. On the background of these reasons, further popularization of the flywheel energy storage system and expansion of its application range are strongly expected.

As is well known, flywheel rotors are roughly divided into a hollow disk (or circular ring) rotor having a through circular hole at the center of a rotation mass disk and a solid disk rotor not having a through circular hole at the center of a rotation mass disk.

Between them, the present invention is an invention related to the latter solid disk rotor, and particularly to improvement in limit energy density $D_{FR}$ of a solid disk rotor made of a single isotropic bulk material or weak anisotropic bulk material. When rotors having the same outer radius are rotated at the same angular velocity, a solid disk rotor has an excellent characteristic that a rotation stress (maximum value) is about the half of the rotation stress in a hollow disk rotor.

In general, one of important problems for enhancing performance of a flywheel energy storage system is to increase the limit energy density of a flywheel rotor, that is, the limit energy density $D_{FR}$ that can be stored per rotor unit mass. The meaning of "limit" indicates a state when a maximum value $\sigma_{MAX}$ of a rotation stress $\sigma$ (a radial stress $\sigma_r$ or a circumferential stress $\sigma_\theta$) occurring in the entire inside of the flywheel rotor reaches a yield strength $\sigma_y$ of a rotor material. In the simplest solid flat disk rotor, the rotation stress shows a distribution having the maximum value $\sigma_{MAX}$ at a rotation center and decreasing monotonously along with the radius.

When a rotor reduced in thickness such that the thickness of a solid flat disk rotor becomes smaller toward the outer circumference is created, the distribution of a rotation stress is entirely planarized, so that the maximum rotation stress $\sigma_{MAX}$ is diminished. It is known that this effect increases a fracture angular velocity ω and can improve the limit energy density $D_{FR}$. However, the upper surface and lower surface of the constant stress disk shall have a plane-symmetric shape with respect to a horizontal center plane of the rotor.

A constant stress disk rotor of a flywheel described in Patent Literature 1 below has been conventionally known. This rotor is a modification made such that a constant stress solid disk rotor (what is called a Stodola rotor) having an infinite radius discussed in Non Patent Literature 1 can be applied with a finite radius R, and includes a "thickness decreasing region" in which a thickness t is reduced from the center to a certain radius $R_C$ in accordance with a function of $t(r) = t_0 \exp(-Cr^2)$ and a "constant thickness region" having a thickness $T = t_0 \exp(-CR_C^2) = $ constant from the radius $R_C$ to the outer circumference (the outer radius R). In the expressions, the symbol r is any radius in the disk, $t_0$ is the thickness at the center of the disk, C is a coefficient for determining the degree of decrease in thickness of the thickness decreasing region, $C = \rho\omega^2/2S_0$, ρ is the density of a rotor material, ω is the fracture rotation angular velocity of the rotor, and $S_0$ is the yield strength of the rotor material.

CITATION LIST

Patent Literature

Patent Literature 1: The description of U.S. Pat. No. 4,408,500

Non Patent Literature

Non Patent Literature 1: A. Stodola, "Steam and Gas Turbines," The McGraw-Hill Book Company, Inc., New York, N.Y., 1927

SUMMARY OF INVENTION

Technical Problem

However, in the conventional solid disk rotor described in Patent Literature 1, the fracture rotation angular velocity ω which is an unknown number is included in components of the constant C, so that the structure of the rotor (specifically, the function t(r) and R) is not determined. Further, a relationship between the outer radius R and $R_C$ is indeterminate, and it is therefore difficult to analytically predict the stress distribution and the limit energy density $D_{FR}$. Consequently, a problem arises in that it is not easy to obtain a solid disk rotor having an optimum structure.

In view of the above-described problem, the present invention has an object to provide a constant stress solid disk rotor of a flywheel having an optimum structure in accordance with given conditions and a design method that enables the constant stress solid disk rotor of a flywheel to be easily obtained.

Solution to Problem

In order to achieve the above-described object, the present invention provides a constant stress solid disk rotor of a flywheel, having an outer shape having an upper surface and a lower surface which are plane-symmetric with respect to a single-center rotation plane perpendicular to a rotation axis, an outer circumferential radius b, and a rotation center thickness $h_0$, the constant stress solid disk rotor of the flywheel having a shape including a thickness decreasing region which decreases monotonously in thickness from a rotation center to a connection radius a and a constant thickness region located on an outer edge of the thickness decreasing region and having a constant thickness $h_a$ from the connection radius a to the outer radius b. Shape parameters including the outer circumferential radius b, the rotation center thickness $h_0$, the connection radius a, and the outer edge thickness $h_a$ satisfy an equation below:

[Expression 1]

$$\frac{a}{b} = \sqrt{\frac{1}{2}\left(-\frac{2}{1-v}\left(1+v-\frac{2}{\ln\left(\frac{h_a}{h_0}\right)}\right)+\sqrt{\left(\frac{2}{1-v}\left(1+v-\frac{2}{\ln\left(\frac{h_a}{h_0}\right)}\right)\right)^2 + \frac{4(3+v)}{1-v}}\right)}$$

where $v$ is a Poisson's ratio of a rotor material.

In the constant stress solid disk rotor of the flywheel of the present invention, the connection radius a and the outer edge thickness $h_a$ are set without depending on a rotation angular velocity.

In the constant stress solid disk rotor of the flywheel of the present invention, the thickness decreasing region is formed in a shape in which an in-plane stress of the thickness decreasing region is always invariant entirely in the thickness decreasing region.

In the constant stress solid disk rotor of the flywheel of the present invention, the constant thickness region is formed in a shape in which an in-plane stress of the constant thickness region decreases monotonously from a stress value which is invariant in a plane of the thickness decreasing region toward the outer circumferential radius b from the rotation center.

In the constant stress solid disk rotor of the flywheel of the present invention, a thickness h of the thickness decreasing region is expressed by an expression below:

[Expression 2]

$$h(r) = h_0 e^{\frac{\ln\left(\frac{h_a}{h_0}\right)}{a^2}r^2}$$

In the constant stress solid disk rotor of the flywheel of the present invention, when rotating with the thickness decreasing region producing an in-plane stress $\sigma_a$, a rotation angular velocity $\omega$ is expressed by an expression below:

[Expression 3]

$$\omega = \sqrt{-\frac{\sigma_a \ln\left(\frac{h_a}{h_0}\right)}{\rho a^2}}$$

where $\rho$ is a density of the rotor material.

Assuming that a yield strength of the rotor material is $\sigma_y$, a limit energy density $D_{FR}$ is expressed by an equation below:

[Expression 4]

$$D_{FR} = \frac{-\left(\left(\frac{a}{b}\right)^4\left(\frac{h_a}{h_0}\ln\left(\frac{h_a}{h_0}\right)-\left(\frac{h_a}{h_0}-1\right)\right)+\frac{1}{2}\left(\frac{h_a}{h_0}\right)\left(\ln\left(\frac{h_a}{h_0}\right)\right)^2\left(1-\left(\frac{a}{b}\right)^4\right)\right)}{\left(\frac{a}{b}\right)^2\left(\left(\frac{a}{b}\right)^2\left(\frac{h_a}{h_0}-1\right)+\left(\frac{h_a}{h_0}\right)\ln\left(\frac{h_a}{h_0}\right)\left(1-\left(\frac{a}{b}\right)^2\right)\right)} \times \frac{\sigma_y}{\rho}$$

The present invention also provides a method for designing the constant stress solid disk rotor of the flywheel having the above-described configuration, in which any three parameters among four parameters of the outer circumferential radius b, the rotation center thickness $h_0$, the connection radius a, and the outer edge thickness $h_a$ are given, and a remaining one parameter is determined.

The present invention also provides a method for designing the constant stress solid disk rotor of the flywheel having the above-described configuration, in which any three parameters among six parameters of the limit energy density $D_{FR}$, a mass, the outer circumferential radius b, the rotation center thickness $h_0$, the connection radius a, and the outer edge thickness $h_a$ of the constant stress solid disk rotor of the flywheel are given, and remaining three parameters are determined.

BRIEF DESCRIPTION OF DRAWINGS

FIG. 5 is a graph in which a shape basic equation and a rotor mass ($m_{ab}$) equation of a constant stress solid disk rotor of a flywheel according to a third embodiment of the present invention are plotted as the function of a/b and $h_a/h_0$.

DESCRIPTION OF EMBODIMENTS

Figure 1:
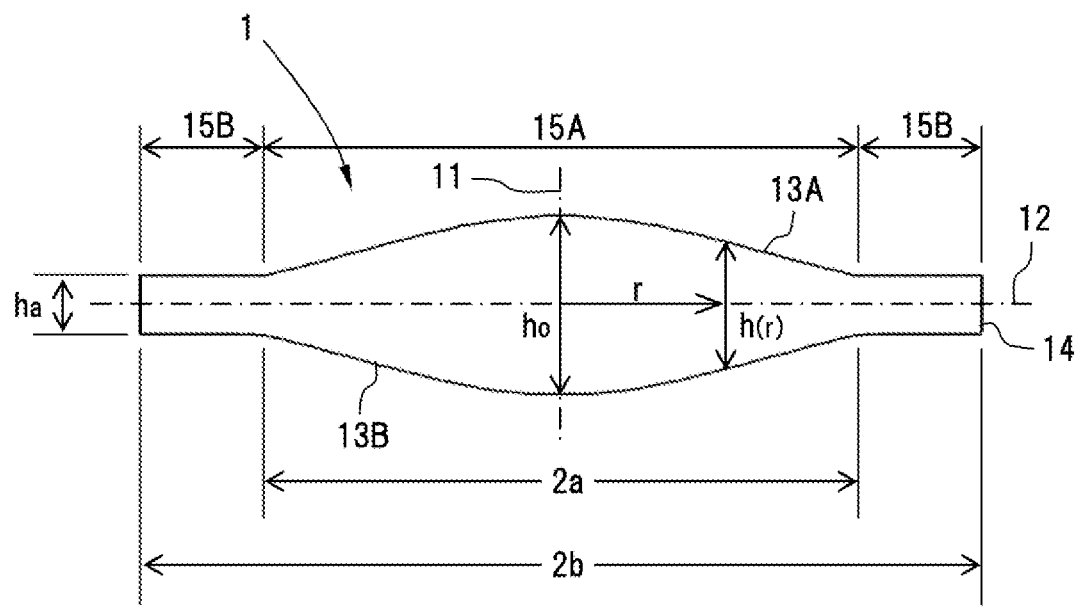
FIG. 1 is an explanatory cross-sectional view showing a configuration of a constant stress solid disk rotor of a flywheel of the present invention.

Embodiments of a constant stress solid disk rotor of a flywheel of the present invention will be described with reference to the drawings. However, in these drawings, the relationship between thicknesses and planar dimensions, the thickness ratio between respective layers, and the like are drawn in an exaggerated manner for ease of understanding. Identical members are denoted by an identical reference character, and repeated description will be omitted.

First, a structure of a constant stress solid disk rotor of a flywheel of the present invention, relational expressions to be established by the structure, effects to be obtained, and the like will be described using the cross-sectional view of FIG. 1.

FIG. 1 is a cross-sectional view of a constant stress solid disk rotor 1 (hereinafter simply referred to as the rotor 1) of a flywheel when cut along a rotation axis 11 at any rotation angle. The same shape as the shape of FIG. 1 is obtained when the rotor 1 is cut at any rotation angle. A line 12 represents a horizontal center plane of the rotor 1, and is perpendicular to the rotation axis 11.

As shown in FIG. 1, the rotor 1 is a disk having an outer circumferential radius b (a diameter 2b) with the rotation axis 11 placed at the center. The rotor 1 includes three surfaces, that is, an upper surface 13A, a lower surface 13B, and a side surface 14. The upper surface 13A and the lower surface 13B are plane-symmetric (line-symmetric in the cross-sectional view) with respect to the above-described horizontal center plane 12.

The material of the rotor 1 is a solid material that exhibits isotropy or weak anisotropy. Examples thereof include, but are not limited to, metal, ceramics, polymer (solid resin), and the like.

Hereinafter, it is assumed that the material to be used for the rotor 1 has a density $\rho$, a yield strength $\sigma_y$, and a Poisson's ratio $\nu$, which will be collectively referred to as material parameters.

Assuming that a thickness between the upper surface 13A and the lower surface 13B at a distance of the radius r from the rotation axis 11 is h(r), the rotor 1 is segmented into a thickness decreasing region 15A in which a thickness h decreases toward the outer circumference and a constant thickness region 15B located on the outer edge of the thickness decreasing region 15A and having the constant thickness $h_a$. A radius that gives the boundary between the thickness decreasing region 15A and the constant thickness region 15B is a connection radius a (a diameter 2a).

A thickness at the center of the rotor 1 (rotation center thickness) is represented by $h_0$, and a thickness of the constant thickness region 15B (outer edge thickness) is represented by $h_a$. These thicknesses $h_0$, $h_a$, the above-described outer circumferential radius b, and the connection radius a will be hereinafter collectively referred to as shape parameters.

In the rotor 1, the thickness h of the thickness decreasing region 15A ($0 \le r \le a$) is expressed by Function Expression (1) below:

[Expression 5]

$$h(r) = h_0 e^{\frac{\ln\left(\frac{h_a}{h_0}\right)}{a^2} r^2} \quad (1)$$

It is apparent from FIG. 1 that $h_a < h_0$ holds, and therefore, a coefficient of $r^2$ in Expression (1) above:

[Expression 6]

$$\frac{\ln\left(\frac{h_a}{h_0}\right)}{a^2}$$

is not a positive but negative constant. Therefore, h is a decreasing function that approaches asymptotically to zero as r increases.

It is understood that the rotation angular velocity $\omega$ is not included in Function Expression (1) above, and therefore, the shape of the thickness decreasing region 15A of the rotor 1 does not depend on the rotation angular velocity.

When substituting r=a into Expression (1) above, $h(a) = h_a$ holds, and this value agrees with the thickness of the constant thickness region 15B. In other words, it is understood that surfaces of the upper and lower surfaces (13A, 13B) at the connection radius a spot between the thickness decreasing region 15A and the constant thickness region 15B have no steps and are continuous as in FIG. 1.

In the rotor 1, the shape parameters $h_0$, $h_a$, b, and a are associated with one another by Shape Basic Equation (2) below. This point is also one of distinctive characteristics of the rotor of the present invention.

[Expression 7]

$$\frac{a}{b} = \cfrac{1}{\sqrt{\frac{1}{2}\left(-\frac{2}{1-\nu}\left(1+\nu-\frac{2}{\ln\left(\frac{h_a}{h_0}\right)}\right)+\sqrt{\left(\frac{2}{1-\nu}\left(1+\nu-\frac{2}{\ln\left(\frac{h_a}{h_0}\right)}\right)\right)^2+\frac{4(3+\nu)}{1-\nu}}\right)}} \quad (2)$$

However, $0 < a/b < 1$ and $0 < h_a/h_0 < 1$ hold, and $\nu$ is the Poisson's ratio of the rotor material.

Shape Basic Equation (2) above can also be expressed as Equation (2)'.

[Expression 8]

$$\frac{h_a}{h_0} = \exp\left(\frac{4}{(1-\nu)\left(\frac{a}{b}\right)^2 + 2(1+\nu) - \frac{3+\nu}{\left(\frac{a}{b}\right)^2}}\right) \quad (2)'$$

The rotor 1 satisfies Shape Basic Equation (2), as a result of which an effect is obtained in which a rotation plane stress $\sigma_a$ (=a circumferential stress $\sigma_{a\theta}$=a radial stress $\sigma_{ar}$) produced in the thickness decreasing region 15A ($0 \le r \le a$) does not depend on an in-plane position (the radius r), but $\sigma_a$ is constant everywhere, that is, ideally averaged.

The rotation plane stress $\sigma_a$ in the thickness decreasing region 15A and the rotation angular velocity $\omega$ of the rotor are associated with each other in Expression (3) below.

[Expression 9]

$$\sigma_a(\omega) = \frac{-\rho \omega^2 a^2}{2 \ln\left(\frac{h_a}{h_0}\right)} \quad (3)$$

This relationship is established until a moment at which the rotor 1 fractures, in other words, until the rotation plane stress $\sigma_a$ of the thickness decreasing region 15A reaches the yield strength $\sigma_y$ of the rotor material. That is, assuming that a fracture rotation angular velocity when the rotor yields is $\omega_y$, Expression (3)' below is established.

[Expression 10]

$$\sigma_y = \frac{-\rho \omega_y^2 a^2}{2 \ln\left(\frac{h_a}{h_0}\right)} \quad (3)'$$

On the other hand, as to a rotation plane stress $\sigma_b$ produced in the constant thickness region 15B ($a \le r \le b$) of the rotor 1, a circumferential stress $\sigma_{br}$ is expressed by Expression (4) below.

[Expression 11]

$$\sigma_{br} = \frac{(3+\nu)}{8} \frac{-\sigma_a}{2\left(\frac{a}{b}\right)^2 \ln\left(\frac{h_a}{h_0}\right)} \left(1 - \left(\frac{1-\nu}{3+\nu}\right)\left(\frac{a}{b}\right)^4 - \left(\frac{r}{b}\right)^2 - \frac{-\left(\frac{1-\nu}{3+\nu}\right)\left(\frac{a}{b}\right)^4}{\left(\frac{r}{b}\right)^2}\right) \quad (4)$$

A radial stress $\sigma_{b\theta}$ is expressed by Expression (5) below.

[Expression 12]

$$\sigma_{b\theta} = \frac{(3+v)}{8} \frac{-\sigma_a}{2\left(\frac{a}{b}\right)^2 \ln\left(\frac{h_a}{h_0}\right)} \left(1 - \left(\frac{1-v}{3+v}\right)\left(\frac{a}{b}\right)^4 - \frac{1+3v}{3+v}\left(\frac{r}{b}\right)^2 + \frac{-\left(\frac{1-v}{3+v}\right)\left(\frac{a}{b}\right)^4}{\left(\frac{r}{b}\right)^2}\right) \quad (5)$$

Expressions (4) and (5) above include the rotation plane stress of the thickness decreasing region 15A.

Figure 3:
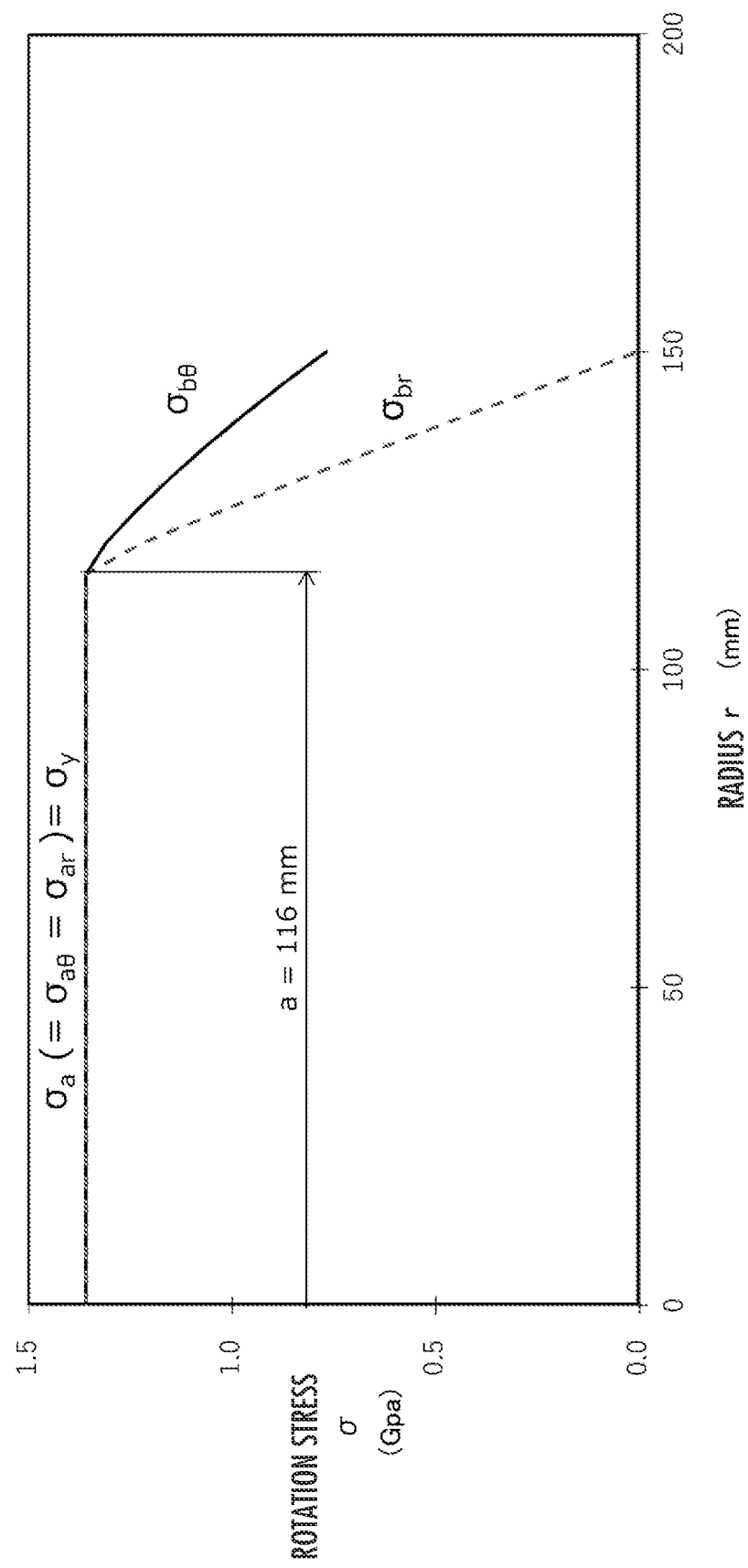
FIG. 3 is a graph showing a radial direction limit (fracture) stress distribution of the constant stress solid disk rotor of the flywheel according to the first embodiment of the present invention.

The above-described expressions of $\sigma_{br}$ and $\sigma_{b\theta}$ are functions in which $\sigma_a$ is given at r=a and values decrease monotonously toward the outer circumference r=b as shown in FIG. 3 which will be mentioned later, and therefore, the maximum stress indicated by the rotor 1 is the value $\sigma_a$ of the rotation plane stress of the thickness decreasing region 15A at any rotation angular velocity. Consequently, the rotor 1 fractures when the rotation plane stress of the thickness decreasing region 15A becomes the yield strength of the rotor material, that is, when $\sigma_a = \sigma_y$ holds.

Calculating based on this knowledge, the limit energy density $D_{FR}$ of the rotor 1 is finally described by Expression (6) below only using the shape parameters and the material parameters ($\sigma_y$ and $\rho$).

[Expression 13]

$$D_{FR} = K_{SF} \frac{\sigma_y}{\rho} \quad (6)$$

However, $K_{SF}$ in Expression (6) is expressed by an expression below.

[Expression 14]

$$K_{SF} = \frac{-\left(\left(\frac{a}{b}\right)^4 \left(\frac{h_a}{h_0} \ln\left(\frac{h_a}{h_0}\right) - \left(\frac{h_a}{h_0} - 1\right)\right) + \frac{1}{2}\left(\frac{h_a}{h_0}\right)\left(\ln\left(\frac{h_a}{h_0}\right)\right)^2 \left(1 - \left(\frac{a}{b}\right)^4\right)\right)}{\left(\frac{a}{b}\right)^2 \left(\left(\frac{a}{b}\right)^2 \left(\frac{h_a}{h_0} - 1\right) + \left(\frac{h_a}{h_0}\right) \ln\left(\frac{h_a}{h_0}\right)\left(1 - \left(\frac{a}{b}\right)^2\right)\right)}$$

Hereinafter, Expression (6) above will be referred to as a limit energy density equation.

At last, a mass $m_{AB}$ of the rotor 1 is described as Expression (7) below.

[Expression 15]

$$m_{AB} = \frac{\rho \pi h_0 a^2}{\ln\left(\frac{h_a}{h_0}\right)} \left(\frac{h_a}{h_0} - 1\right) + \rho \pi h_a (b^2 - a^2) \quad (7)$$

The first term on the right side of Expression (7) corresponds to the mass of the thickness decreasing region 15A, and the second term corresponds to the mass of the constant thickness region 15B. Hereinafter, Expression (7) will be referred to as a rotor mass equation.

Effects of the rotor 1 having the above configuration will be described. As is apparent with reference to Expression (1), the thickness h(r) of the thickness decreasing region of the rotor of the embodiment of the present invention (corresponding to t(r) in Patent Literature 1) is invariant with respect to the rotation angular velocity $\omega$ including the fracture rotation angular velocity $\omega_y$, and is determined only by the shape parameters. Therefore, it can be said that the rotor 1 according to the present embodiment solves the problem in that "the structure of the rotor is indeterminate" which is the first problem in the conventional technology (Patent Literature 1; the same applies below).

As is also apparent with reference to Shape Basic Equation (2), in the rotor 1 of the present embodiment, the outer circumferential radius b and the connection radius a are definitely associated with each other in Expression (2), and are not indeterminate like R in Patent Literature 1 (corresponding to b in the present invention). Therefore, it can be said that the problem in that "it is difficult to analytically predict the stress distribution and the limit energy density $D_{FR}$" which is the second problem in the conventional technology is solved.

Thus, the rotor 1 of the present embodiment achieves a state in which the rotation stress distribution in the thickness decreasing region is made completely flat in addition to the above-described two effects, so that the peak of the rotation stress is ideally reduced. As a result, optimization of the structural parameters and maximization of the energy density are achieved. In other words, it can be said that the rotor 1 of the present embodiment solves the problem in that "it is not easy to obtain an optimum structure" which is the third problem in the conventional technology.

Hereinafter, specific examples in accordance with an actual design will be described using the rotor 1 and its relational expressions. Any material that exhibits isotropy or weak anisotropy can be used for the rotor 1 according to the present invention. Herein, a specific material will be described citing a case of using the QCM8 steel (SANYO SPECIAL STEEL Co., Ltd. (Himeji, Hyogo)) evolved from the high-strength SK105 steel as an example. This is merely an example, and anybody can decide the rotor structure according to the present invention by following exactly the same procedure as a procedure which will be described herein even in a case of using another material.

Typical values of the material parameters of the QCM8 steel are as follows: the density $\rho=7734$ kg/m$^3$, the Poisson's ratio $v=0.34$, and the yield strength $\sigma_y=1.36\times10^9$ Pa.

Example 1

Example 1 is an example of giving some of the shape parameters for determining the physical frame of the rotor 1 as the required specifications to determine an optimum structure of the rotor of the present invention. If any three of the four shape parameters ($h_0$, $h_a$, b, and a) are designated (as the required specifications), the remaining one is automatically determined because the rotor 1 necessarily needs to satisfy Shape Basic Equation (2) as described above.

From the perspective of producing a rotor of a flywheel energy storage system, an actually possible combination of the three parameters is ($h_0$, $h_a$, and b) because they substantially determine the physical frame of the rotor 1. In view of this point, a description will be provided herein assuming that these ($h_0$, $h_a$, and b) are given as the required specifications.

With the values of the three parameters ($h_0$, $h_a$, and b) given, the value of the connection radius a is determined when the three parameters are substituted into Shape Basic Equation (2).

When the value of the connection radius a is determined, the function h(r) for determining the surface shape of the thickness decreasing region 15A is determined from Expression (1). The structure of the rotor 1 is totally settled accordingly.

When the structure of the rotor 1 is totally settled, the limit energy density $D_{FR}$ is calculated by substituting the values of the shape parameter and the material parameters into Relational Expression (6).

The fracture rotation angular velocity $\omega_y$ is obtained from Expression (3)'.

The mass $m_{AB}$ of the rotor 1 can be calculated by Equation (7).

Figure 2:
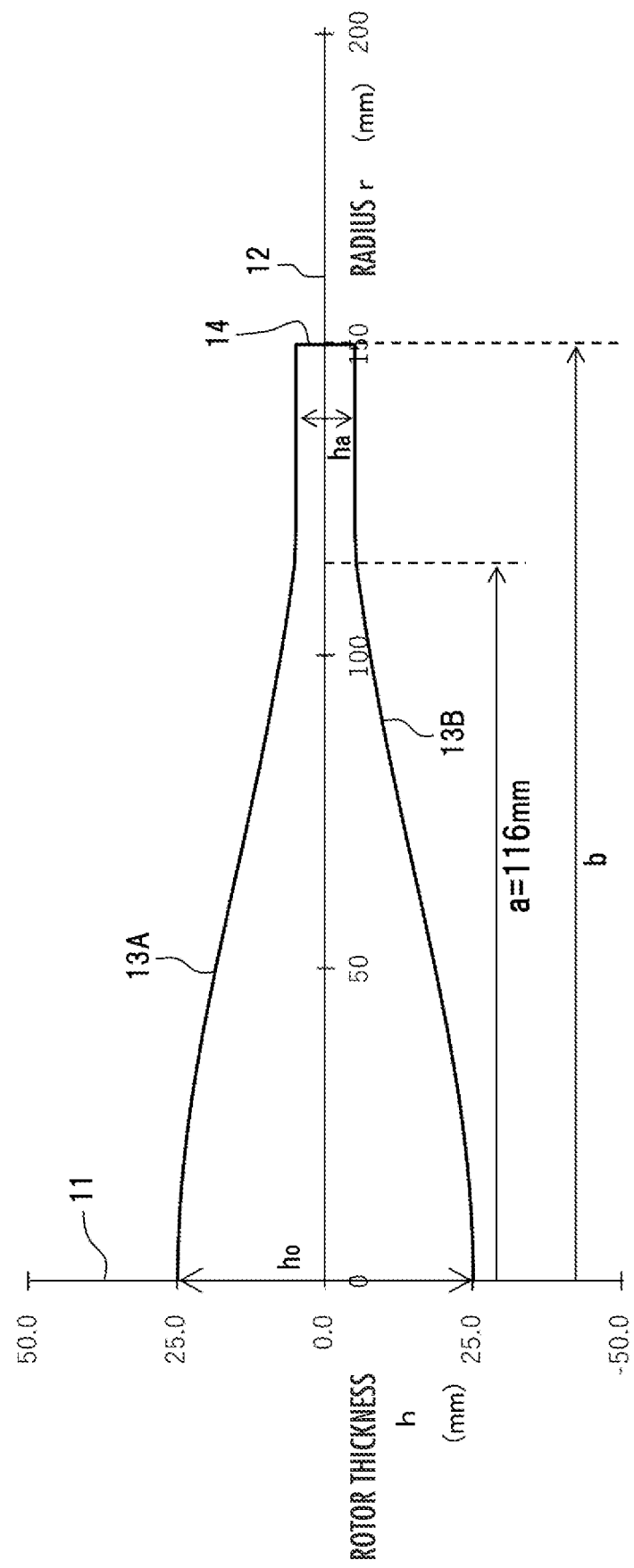
FIG. 2 is a graph showing an outer shape profile of a constant stress solid disk rotor of a flywheel according to a first embodiment of the present invention.

Suppose that the shape parameters ($h_0$, $h_a$, and b) of the rotor 1 have numerical values of: $h_0$=0.05 m (5 cm); $h_a$=0.01 m (1 cm); and b=0.15 m (15 cm), the following values and expressions are obtained.

a=0.116 m (11.6 cm)
h(r)=0.01 exp(−119.1 r²) (m)
$D_{FR}$=45 Wh/kg
$\omega_y$=6472 rad/s
$m_{AB}$=10.34 kg FIG. 2 is a radial direction surface shape of the cross-section of the rotor 1 of the first embodiment of the present invention determined by the above-described process. It is understood that the respective shape parameters are correctly reflected.

FIG. 3 shows a radial direction distribution of the rotation stress σ when the rotor 1 of the first embodiment of the present invention reaches the limit energy density. It is clearly recognized that in the thickness decreasing region 15A, the rotation stress is $\sigma_a(=\sigma_{br}=\sigma_{b\theta})=\sigma_y$=constant, and in the constant thickness region 15B, a manner in which the values of the rotation stresses $\sigma_{br}$ and $\sigma_{b\theta}$ decrease monotonously from $\sigma_a$.

Example 2

One of property parameters which is most likely to be included in the required specifications of a rotor of an actual flywheel energy storage system is considered to be the limit energy density $D_{FR}$. Thus, in Example 2, an example in which the property parameter $D_{FR}$ is included in the required specifications as a target value is cited.

When Limit Energy Density Equation (6) above is deformed under conditions that 0<a/b<1 and 0<$h_a$/$h_0$<1, Expression (6)' below is obtained.

[Expression 16]

$$\frac{a}{b} = \sqrt{\frac{1}{2A}\left(-B - \sqrt{B^2 - 4AC}\right)} \quad (6)'$$

Herein, A, B, and C in Equation (6)' are expressed by expressions below.

[Expression 17]

$$A = \left(1 - \frac{h_a}{h_0} + \frac{h_a}{h_0}\ln\left(\frac{h_a}{h_0}\right)\right)(1 - K_{SF}) - \frac{1}{2}\frac{h_a}{h_0}\left(\ln\left(\frac{h_a}{h_0}\right)\right)^2 \quad (6a)'$$

$$B = K_{SF}\frac{h_a}{h_0}\ln\left(\frac{h_a}{h_0}\right) \quad (6b)'$$

$$C = \frac{1}{2}\frac{h_a}{h_0}\left(\ln\left(\frac{h_a}{h_0}\right)\right)^2 \quad (6c)'$$

In the case of Example 2, the shape parameters ($h_0$, $h_a$, b, and a) need to satisfy Shape Basic Equation (2) and Limit Energy Density Equation (6)' at the same time. Thus, it is appreciated that if the limit energy density $D_{FR}$ and any two of the shape parameters are designated as the required specifications, an optimum solution is obtained.

Consideration of a combination of two parameters which are likely to be selected from among the shape parameters as the required specifications from a viewpoint of producing the rotor of the flywheel energy storage system results in ($h_0$ and b). This is because they define the physical frame of the rotor 1 most strongly. In view of this point, a description will be provided assuming that $D_{FR}$, $h_0$, and b are given as the required specifications, but the combination of the shape parameters is not limited to ($h_0$ and b), and any two can be selected.

The following is a procedure of determining the unknown shape parameters $h_a$ and a. When $D_{FR}$ is given as a target value, Limit Energy Density Equation (6)' is settled. Next, Shape Basic Equation (2) and Limit Energy Density Equation (6)' are set up simultaneously to obtain numerical solutions of a/b and $h_a$/$h_0$. When substituting the requested values $h_0$ and b into the solutions, $h_a$ and a are obtained.

As in Example 1, the fracture rotation angular velocity $\omega_y$ of the rotor 1 is calculated from Expression (3)', and the mass $m_{AB}$ is calculated from Expression (7).

Herein, an optimum design shall be endeavored assuming that the respective requested values of $D_{FR}$, $h_0$, and b are such that $D_{FR}$=40 Wh/kg (=40×3600 J/kg), $h_0$=0.03 m (3 cm), and b=0.15 m (15 cm).

Figure 4:
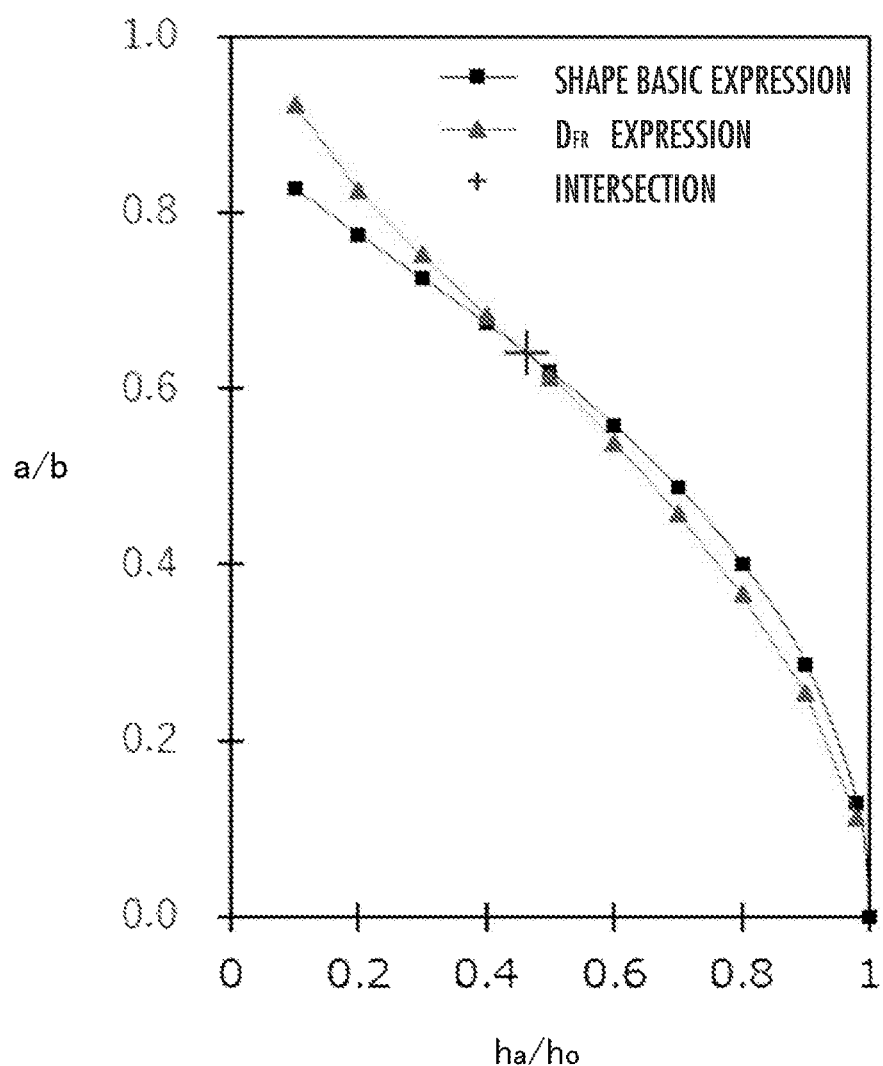
FIG. 4 is a graph in which a shape basic equation and an energy density ($D_{FR}$) equation of a constant stress solid disk rotor of a flywheel according to a second embodiment of the present invention are plotted as a function of a/b and $h_a/h_0$.

FIG. 4 is a graph in which Shape Basic Equation (2) and Limit Energy Density Equation (6)' of the above-described $D_{FR}$ value are plotted as curves of a/b vs $h_a$/$h_0$. It is obvious that the solutions a/b and $h_a$/$h_0$ are obtained from the fact that the two curves cross each other. When actually calculating solutions using a bisection method, a/b=0.641 and $h_a$/$h_0$=0.463 hold. When substituting the requested values (the above-described numerical values) of $h_0$ and b into these relational expressions, the values of $h_a$ and a are calculated.

Finally, the following values and expressions are obtained.

a=0.096 m (9.6 cm)
$h_a$=0.014 m (1.4 cm)
h(r)=0.03 exp(−83.5 r²) (m)
$\omega_y$=5419 rad/s
$m_{AB}$=9.16 kg Example 3

Another property parameter which is likely to be included in the required specifications of the rotor 1 is considered to be the mass $m_{AB}$ of the rotor. Thus, an example in which $m_{AB}$ is included in the required specifications as a target value will be cited as Example 3.

When deformed under the conditions that 0<a/b<1 and 0<$h_a$/$h_0$<1, Rotor Mass Equation (7) above is rewritten as Equation (7)' or (7)" below, which can be used as a substitute for Expression (7) as appropriate.

[Expression 18]

$$\frac{a}{b} = \sqrt{\frac{\left(\frac{m_{ab}}{\rho h_0 \pi b^2} - \frac{h_a}{h_0}\right)\ln\left(\frac{h_a}{h_0}\right)}{\frac{h_a}{h_0} - 1 - \frac{h_a}{h_0}\ln\left(\frac{h_a}{h_0}\right)}} \quad (7)'$$

-continued $$\frac{a}{b} = \sqrt{\left(\left(\frac{m_{ab}}{\rho h_0 \pi b^2} - 1\right) \frac{\frac{h_a}{h_0} \ln\left(\frac{h_a}{h_0}\right)}{\frac{h_a}{h_0} - 1 - \frac{h_a}{h_0} \ln\left(\frac{h_a}{h_0}\right)}\right)} \quad (7)''$$

In the case of Example 3, the shape parameters ($h_0$, $h_a$, b, and a) need to satisfy Shape Basic Equation (2) and Rotor Mass Equation (7) (or (7)' or (7)'') at the same time. Thus, an optimum structure will be obtained if the rotor mass $m_{AB}$ and two of the shape parameters are designated as the required specifications.

From the viewpoint of producing the rotor of the flywheel energy storage system, two shape parameters which are likely to be selected as the required specifications are considered to be $h_0$ and b as in Example 2. A description will also be provided in Example 3 in view of this point assuming that $m_{AB}$, $h_0$, and b are given as the required specifications. The combination of the shape parameters is not limited to ($h_0$ and b), and a combination of any two can be selected.

The following is a procedure of determining the unknown shape parameters $h_a$ and a. When $m_{AB}$, $h_0$, and b are given as target values, Rotor Mass Equation (7)' is settled. When setting up Rotor Mass Equation (7)' and Limit Energy Density Equation (6)' simultaneously to solve the expressions paying attention to the fact that $h_0$ and b are known numbers, the numerical solutions a/b and $h_a/h_0$ are obtained. Since $h_0$ and b are known numbers, $h_a$ and a are obtained.

As in Example 1 described earlier, the function h(r) of the thickness decreasing region 15A of the rotor 1 can be calculated from Expression (1), the limit energy density can be calculated from Equation (6), the fracture rotation angular velocity $\omega_y$ can be calculated from Expression (3)', and the mass $m_{AB}$ can be calculated from Equation (7).

Herein, an optimum design shall be endeavored assuming that the respective requested values of $m_{AB}$, $h_0$, and b are such that $m_{AB}$=12 kg, $h_0$=0.04 m (4 cm), and b=0.15 m (15 cm).

FIG. 5 is a graph in which Shape Basic Equation (2) and Rotor Mass Equation (7)' of the above-described $D_{FR}$ value are plotted as curves of a/b vs $h_a/h_0$ (however, $h_0$ and b are known numbers). From the fact that the two curves cross each other, it is obvious that the solutions a/b and $h_a/h_0$ are obtained. When actually calculating solutions using a bisection method, a/b=0.649 and $h_a/h_0$=0.448 are obtained. When the values of the known numbers $h_0$ and b are substituted into these relational expressions, the values of $h_a$ and a are calculated.

Finally, the following rotor specification elements are obtained.

a=0.097 m (9.7 cm)
$h_a$=0.018 m (1.8 cm)
h(r)=0.04 exp(−84.8 $r^2$) (m)
$\omega_y$=5462 rad/s
$D_{FR}$=40 Wh/kg (=40×3600 J/kg)

Other Examples

For the constant stress solid disk rotor of a flywheel according to the present invention, the limit energy density $D_{FR}$ and the mass $m_{AB}$ which are the property parameters as well as one of the shape parameters (e.g., the outer circumferential radius b) can also be designated as the required specifications to determine optimum values of the remaining three shape parameters. In this case, three of the shape basic expression, the limit energy density expression, and the rotor mass expression are set up simultaneously to calculate the remaining three shape parameters.

This procedure will be simply described citing an example of designating the outer circumferential radius b as the shape parameter. First, Shape Basic Equation (2) and Limit Energy Density Equation (6)' are set up simultaneously to calculate numerical solutions of the unknown number a/b and the unknown number $h_a/h_0$, and the value of b is substituted into the former to settle the value of a.

Next, the calculated values of $h_a/h_0$, a, and b are substituted into Rotor Mass Equation (7) to settle the value of $h_a$, and the value of $h_0$ is calculated from the value of $h_a/h_0$ and the value of $h_a$. In this manner, optimum values of the structural parameters a, $h_a$, and $h_0$ which are unknown are all settled.

REFERENCE SIGNS LIST 1 constant stress solid disk rotor of flywheel of the present invention
11 rotation axis
12 horizontal center plane
13A upper surface
13B lower surface
14 side surface
15A thickness decreasing region
15B constant thickness region
b rotor radius (outer circumferential radius)
a connection radius (radius at boundary between thickness decreasing region and constant thickness region)
$h_a$ thickness of constant thickness region
$h_0$ center thickness
r radius at any spot
h(r) function representing thickness at radius r spot

The invention claimed is:

1. A constant stress solid disk rotor of a flywheel, having an outer shape having an upper surface and a lower surface which are plane-symmetric with respect to a single-center rotation plane perpendicular to a rotation axis, an outer circumferential radius b, and a rotation center thickness $h_0$, the constant stress solid disk rotor of the flywheel having a shape including a thickness decreasing region which decreases monotonously in thickness from a rotation center to a connection radius a and a constant thickness region located on an outer edge of the thickness decreasing region and having a constant thickness $h_a$ from the connection radius a to the outer circumferential radius b, wherein shape parameters including the outer circumferential radius b, the rotation center thickness $h_0$, the connection radius a, and the outer edge thickness $h_a$ satisfy an equation below:

[Expression 1]

$$\frac{a}{b} = \sqrt{\frac{1}{2}\left(-\frac{2}{1-v}\left(1 + v - \frac{2}{\ln\left(\frac{h_a}{h_0}\right)}\right) + \sqrt{\left(\frac{2}{1-v}\left(1 + v - \frac{2}{\ln\left(\frac{h_a}{h_0}\right)}\right)\right)^2 + \frac{4(3+v)}{1-v}}\right)}$$

where v is a Poisson's ratio of a rotor material.

2. The constant stress solid disk rotor of the flywheel according to claim 1, wherein the connection radius a and the outer edge thickness $h_a$ are set without depending on a rotation angular velocity.

3. The constant stress solid disk rotor of the flywheel according to claim 1, wherein the thickness decreasing region is formed in a shape in which an in-plane stress of the thickness decreasing region is always invariant entirely in the thickness decreasing region.

4. The constant stress solid disk rotor of the flywheel according to claim 3, wherein the constant thickness region is formed in a shape in which an in-plane stress of the constant thickness region decreases monotonously from a stress value which is invariant in a plane of the thickness decreasing region toward the outer circumferential radius b from the rotation center.

5. The constant stress solid disk rotor of the flywheel according to claim 1, wherein a thickness h of the thickness decreasing region is expressed by an expression below:

[Expression 2]

$$h(r) = h_0 e^{\frac{\ln\left(\frac{h_a}{h_0}\right)}{a^2} r^2}.$$

6. The constant stress solid disk rotor of the flywheel according to claim 1, wherein when rotating with the thickness decreasing region producing an in-plane stress $\sigma_a$, a rotation angular velocity $\omega$ is expressed by an expression below:

[Expression 3]

$$\omega = \sqrt{-\frac{\sigma_a \ln\left(\frac{h_a}{h_0}\right)}{\rho a^2}}$$

where $\rho$ is a density of the rotor material.

7. The constant stress solid disk rotor of the flywheel according to claim 1, wherein assuming that a yield strength of the rotor material is $\sigma_y$, a limit energy density $D_{FR}$ is expressed by an equation below:

[Expression 4]

$$D_{FR} = \frac{-\left(\left(\frac{a}{b}\right)^4 \left(\frac{h_a}{h_0}\right) \ln\left(\frac{h_a}{h_0}\right) - \left(\frac{h_a}{h_0} - 1\right)\right) + \frac{1}{2}\left(\frac{h_a}{h_0}\right)\left(\ln\left(\frac{h_a}{h_0}\right)\right)^2 \left(1 - \left(\frac{a}{b}\right)^4\right)}{\left(\frac{a}{b}\right)^2 \left(\left(\frac{a}{b}\right)^2 \left(\frac{h_a}{h_0} - 1\right) + \left(\frac{h_a}{h_0}\right) \ln\left(\frac{h_a}{h_0}\right)\left(1 - \left(\frac{a}{b}\right)^2\right)\right)} \times \frac{\sigma_y}{\rho}.$$

8. A method for designing the constant stress solid disk rotor of the flywheel according to claim 7, wherein any three parameters among six parameters of the limit energy density $D_{FR}$, a mass, the outer circumferential radius b, the rotation center thickness $h_0$, the connection radius a, and the outer edge thickness $h_a$ of the constant stress solid disk rotor of the flywheel are given, and remaining three parameters are determined.

9. A method for designing the constant stress solid disk rotor of the flywheel according to claim 1, wherein any three parameters among four parameters of the outer circumferential radius b, the rotation center thickness $h_0$, the connection radius a, and the outer edge thickness $h_a$ are given, and a remaining one parameter is determined.

* * * * *